United States Patent Office 3,119,296
Patented Jan. 28, 1964

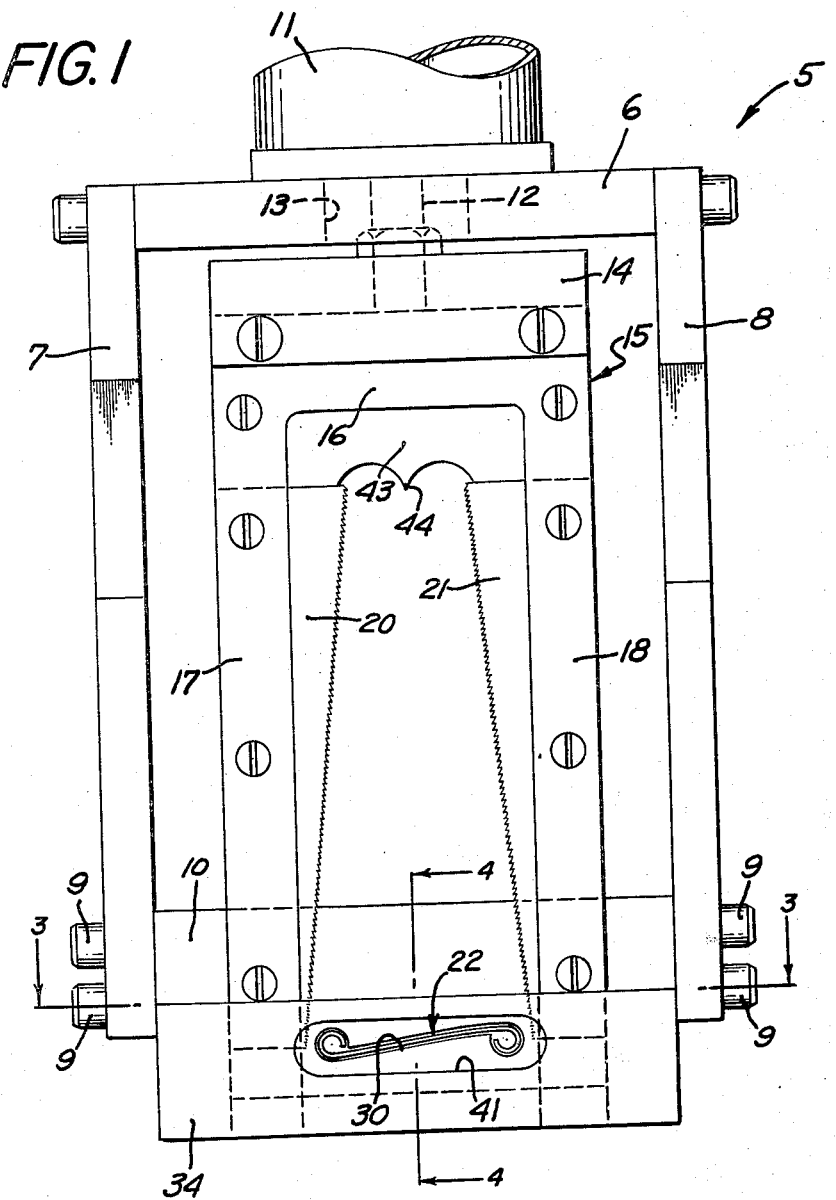

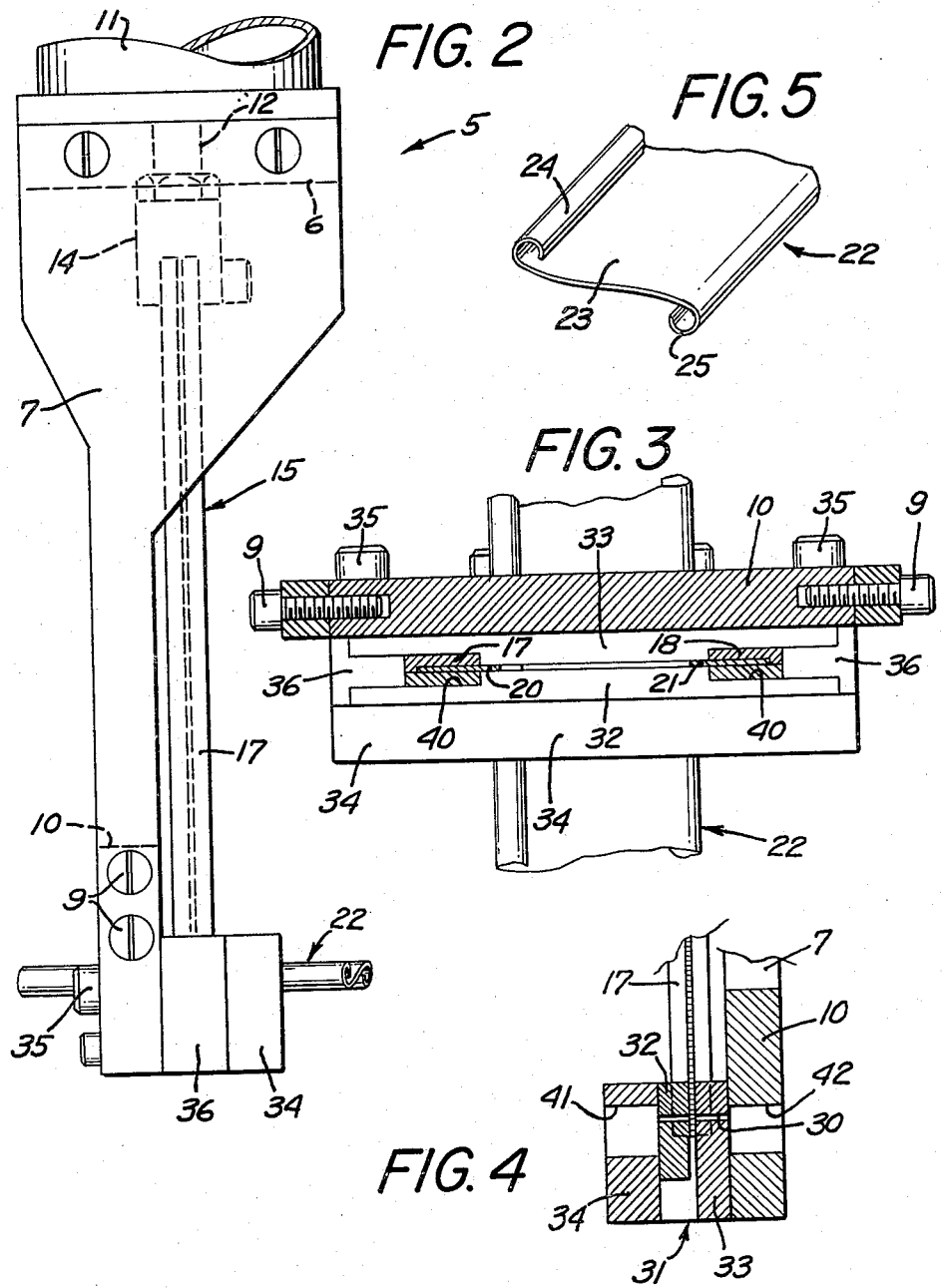

3,119,296
CUT-OFF DEVICE HAVING A SAW PORTION
AND A PROGRESSIVE SHEAR PORTION
Hugh M. Foster, Riverside, Calif., assignor to National
Distillers and Chemical Corporation, a corporation of
Virginia
Filed Dec. 5, 1960, Ser. No. 73,656
2 Claims. (Cl. 83—622)

The present invention relates to a cut-off device for severing a strip of sheet metal wherein there is an edge portion bent out from the relatively flat center portion of the strip, or where the strip has rolled beads along opposite edges thereof.

When strips of such configuration are sheared into lengths by conventional cut-off devices, the beads or bent up edges are flattened or deformed by the shearing blades as they come together. Where the rolled bead blades as they come together. Where the rolled bead along the edges of the strip must interfit with similar rolled beads of another strip to form an awning canopy, or the like, this deformation of the bead by the shearing cutters necessitates reforming of the bead before the parts can be fitted together. Also, such deformation of the edges of the strips detracts from the appearance of the finished awning canopy, patio cover, or the like.

The primary object of the present invention is to provide a cut-off device which is operable to sever sheet metal strip having bent up edges or rolled edge beads, without flattening or deforming the edge portions. This is accomplished by providing a pair of saw-toothed blades on the movable cutter head which engages the formed edges of the strip and saws through the same, after which the center portion of the strip is quickly and cleanly cut through by a shear blade, along a line forming a continuation of the kerf cut by the saws.

Another object of the invention is to provide a cut-off device that is fast acting, simple and inexpensive to build, and sturdy in construction.

These and other objects of the invention will become apparent to those skilled in the art upon consideration of the following detailed description of the prefererd embodiment thereof, reference being had to the accompanying drawings, wherein:

FIGURE 1 is a side elevational view of a cut-off device embodying the principles of the invention;

FIGURE 2 is a side view of the same;

FIGURE 3 is a sectional view taken at 3—3 in FIGURE 1;

FIGURE 4 is a sectional view taken at 4—4 in FIGURE 1; and

FIGURE 5 is a fragmentary perspective view of a sheet metal strip having a relatively flat center portion and oppositely curled beads along opposite edges thereof, of the type that the present cut-off device is particularly adapted to handle.

In the drawings, the reference numeral 5 designates the cut-off device in its entirety, which includes an open-center frame made up of a horizontal top beam 6 having two arms 7 and 8 depending from opposite ends thereof. Extending between the bottom ends of the arms 7 and 8 and connected thereto by screws 9 is a bottom horizontal member 10. A power cylinder 11, which may be either pneumatic or hydraulic, is mounted on the top side of the beam 6 at the mid-point thereof, and the piston rod 12 of the cylinder extends down through an aperture 13 in the cross head 6 and has a head 14 attached to the bottom end thereof.

Mounted on the head 14 and projecting downwardly therefrom is a U-shaped blade holder 15, having a center portion 16 and laterally spaced, parallel arm portions 17 and 18. Secured in suitable slots in the arm portions 17 and 18 are two opposed saw-toothed blades 20 and 21, which extend downwardly toward the bottom end of the frame, with the teeth arranged to cut on the down stroke. The two saw blades 20, 21 lie in a common plane, which is perpendicular to the longitudinal axis of the strip being cut.

FIGURE 5 shows a small section of roll-up awning panel strip, which is representative of the type of strip that can be cut on the present invention. The strip is designated generally by the reference numeral 22, and includes a relatively flat center portion 23 having oppositely facing rolled beads 24 and 25 along opposite edges thereof. The term "relatively flat" as used herein includes any smoothly curved or reversely curved area where the curvature is of large radius, or any area having gradual transition from one plane to another, in which the width dimension is several times the over-all height dimension.

The strip 22 is inserted endwise through a slot 30 in a work holder 31 at the bottom end of the frame, which is made up of two plates 32 and 33, disposed side by side and spaced apart just far enough to provide clearance between them for the saw blades 20, 21. An outer frame member 34 extends across the outside of the work holder 31, and the work holder is clamped between this outer member 34 and the cross piece 10 by means of screws 35. T-shaped filler blocks 36 are interposed between the plates 32, 33 of the work holder, and cooperate therewith to space the plates apart and to form guide slots 40 for the arm portions 17 and 18 of the blade holder 15.

The members 34 and 10 are provided with horizontally elongated apertures 41 and 42, respectively, which expose the entire area of the slot 30 in the work holder, so that the strip 22 can be pushed through the slot from one side of the frame to the other. As best shown in FIGURE 1, the slot 30 is shaped to conform generally to the outside configuration of the strip 22, and is provided with circular enlargements at each end to accommodate the rolled beads 24, 25 thereof. The slot 30 is slightly larger than the strip 22 to allow the latter to slide through freely, and also to shift laterally a very slight amount, to enable the strip to center itself between the saw blades 20, 21.

It will be noted that the teeth of the blades 20, 21 are disposed in two lines that lie at a slight angle to the line of travel of the head 14, and these lines of teeth converge upwardly, as best shown in FIGURE 1, with the teeth at the upper end of the blades 20, 21 spaced apart a distance such that when the head 14 is at the bottom of the cutting stroke, the saw teeth just complete their cut through the beads 24, 25. With the head 14 at the top of its stroke, the distance between the teeth of the blades 20, 21 at the level of the work holder 31 is slightly greater than the overall width of the strip. As the head 14 moves downwardly, the strip 22 is usually engaged on one side first, and the clearance of the slot 30 allows the strip to shift slightly to one side or the other, so as to center itself between the blades 20, 21.

Mounted in the center portion 16 of the work holder 15 is a shear blade 43 having a point 44 in the center thereof which pierces the strip at its centerline and then cuts outwardly in both directions from the center as the cutter approaches the bottom of its stroke. The shear blade 43 is of the same thickness as the saw blades, and lies in the same plane as the latter, so that the shearing cut made by the blade 43 as the cuter reaches the end of its downward travel is along a line connecting the cuts made by the saw-toothed blades 20 and 21.

The operation of my invention is believed to be self-evident from the foregoing description. The strip 22 is inserted endwise into the slot 30 of the work holder 31 so as to bring the desired line of severance into the gap between the plates 32, 33. The power cylinder 11 is then actuated, causing the head 14 to be driven downwardly. The downwardly diverging saw-toothed blades 20 and 21 first center the strip 22 between them, and then saw through the beads 24, 25. The pressure exerted against the beads 24, 25 by the saw-toothed blades 20, 21 is relatively light owing to the progressive nature of the cutting action, and therefore there is no crushing or deforming of the beads. As the saw cuts through the beads are completed, the point 44 of the shear blade 43 penetrates the strip 22 at its midpoint and cuts outwardly in both directions from center along a line connecting the inner ends of the saw kerfs. This completes the severance of the strip, and the head 14 is then raised by the power cylinder to its normal position near the top of the frame.

While I have shown and described in considerable detail what I believe to be the preferred form of my invention, it will be understood that various changes can be made in the shape and arrangement of the several parts without departure from the broad scope of the invention, as defined in the following claims.

I claim:

1. A combined saw and shearing blade for severing a strip of sheet metal having a relatively flat center portion and a rolled bead along at least one longitudinal edge thereof, said device comprising a frame, a pair of spaced apart members mounted side by side on said frame adjacent one end thereof, said members having aligned slots provided therein which are shaped to receive said strip and surround the latter in close-fitting relationship, a blade holder mounted on said frame for reciprocating motion along a line of travel generally perpendicular to said relatively flat center portion of said strip, a toothed saw blade mounted on said holder and disposed to pass between said members on the downstroke of said blade holder to cut a kerf transversely across said rolled edge bead from the outer side thereof, the teeth of said blade being disposed at a relatively small acute angle with respect to the line of travel of said blade holder at an angle such that upon completion of said downstroke, said teeth will have just completed cutting through said rolled bead, and a transversely extending shearing blade mounted on said blade holder adjacent the top end of said saw-toothed blade and in the same transverse plane as the latter, said shearing blade passing between said members and cooperating therewith to produce a transverse progressive shearing action through said relatively flat center portion of said strip in line with the cut made by said saw-toothed blade at the extreme bottom end of the downstroke of said blade holder.

2. A combined saw and shearing blade for severing a strip of sheet metal having a relatively flat center portion and oppositely facing rolled beads along the opposed longitudinal edges thereof, said device comprising an open-center frame having a pair of spaced apart plates mounted side by side at one end thereof, said plates having aligned slots provided therein which are shaped to receive said strip and surround the latter in close-fitting relationship, a U-shaped blade holder mounted on said frame for reciprocating motion along a line of travel generally perpendicular to said relatively flat center portion of said strip, a pair of inwardly facing toothed edge saw blades mounted on the arms of said U-shaped blade holder and disposed to pass between said plates on the downstroke of the blade holder to cut a kerf transversely across both of said rolled edge beads from the outer sides thereof, the inwardly faced toothed edges of said blades converging upwardly at a small acute angle with respect to the line of reciprocating motion such that upon completion of said downstroke, said teeth will have just completed cutting through both of said rolled edge beads, and a transversely extending shearing blade mounted on the center portion of said U-shaped blade holder between said saw-toothed blades and in the same plane as the latter, said shearing blade passing between said plates and cooperating therewith to produce a transverse progressive shearing action through said relatively flat center portion of said strip in line with the cuts made by said pair of saw blades as said blade holder approaches the bottom end of its downstroke.

References Cited in the file of this patent

UNITED STATES PATENTS

| | | |
|---|---|---|
| 392,662 | Carnahan | Nov. 13, 1888 |
| 594,019 | Jefferies | Nov. 23, 1897 |
| 766,495 | Dalgety | Aug. 2, 1904 |
| 858,703 | Castle | July 2, 1907 |
| 1,205,125 | Dies | Nov. 14, 1916 |
| 1,366,063 | Culhane | Jan. 18, 1921 |
| 1,491,022 | Arbon | Apr. 22, 1924 |
| 2,412,311 | Ziska | Dec. 10, 1946 |
| 2,776,003 | Koster | Jan. 1, 1957 |
| 2,802,527 | Castelli | Aug. 13, 1957 |